United States Patent [19]
McSheehy et al.

[11] 3,898,854
[45] Aug. 12, 1975

[54] METHOD OF PROCESSING, TRANSPORTING AND STORING MEAT

[75] Inventors: Richard Y. McSheehy, Houston, Tex.; Harold G. Jones, Huntsville, Ala.

[73] Assignee: Ecodyn Systems, Inc., Houston, Tex.

[22] Filed: Feb. 1, 1974

[21] Appl. No.: 438,746

[52] U.S. Cl. .......................... 62/62; 62/237; 62/298; 98/36; 426/524
[51] Int. Cl. ............................................. F25d 25/02
[58] Field of Search ................. 62/62, 65, 237, 298; 98/36; 426/524

[56] References Cited
UNITED STATES PATENTS
2,585,360  2/1952  Williams .............................. 62/237
3,557,567  1/1971  Brennan ................................ 62/60

Primary Examiner—William F. O'Dea
Assistant Examiner—Ronald C. Capossela
Attorney, Agent, or Firm—Torres & Berryhill

[57] ABSTRACT

A food transporting and storage system comprising: one or more insulated portable food lockers having a heat exchanger therein; a refrigerant system, including a refrigerant compressor, capable of maintaining the food lockers at a temperature of between 30°F and 40°F; and coupling means for connecting and disconnecting the refrigerant system to and from the food lockers, permitting the food lockers to be transported independently of the refrigerant system to and from other locations. Such a system may be utilized in a method of processing, transporting and storing meat comprising the steps of: cutting and packaging meat; placing packaged meat in the portable locker units; reducing the temperature of the packaged meat within the locker units to temperatures between 30°F and 40°F; transporting the packaged meat and locker units to a point of distribution; connecting the locker unit heat exchangers to the refrigerant system located at the point of distribution; and maintaining the packaged meat and interior of the locker units at temperatures between 30°F and 40°F.

6 Claims, 4 Drawing Figures

METHOD OF PROCESSING, TRANSPORTING AND STORING MEAT

BACKGROUND OF THE INVENTION

1. Field of the Invention

The present invention pertains to methods and systems for processing, transporting and storing foods. In particular, the present invention pertains to methods and systems suitable for processing, transporting and storing meat in controlled environments and at regulated temperatures for suppressing bacteria contamination and growth.

2. Description of the Prior Art

The processing, transporting and storage of fresh foods has always been a problem. Although many foods are frozen, the public, as a general rule, prefers fresh foods. This is particularly true of meat.

Foods which are not frozen are susceptible to bacteria contamination. Too much bacteria contamination will damage the food in both appearance and quality. In particular, bacteria is the cause of turning meat dark and decreasing the shelf life at points of distribution, especially retail locations.

Of course many improvements have been made in the processing, transporting and storage of food to improve the quality and shelf life. In particular, meats are maintained at relatively low temperatures during cutting and packaging and are stored in low temperature environments. This of course requires large refrigeration systems at the points of processing, distribution and sale.

However, one of the most difficult problems in handling meat is during the transportation from a food processing center to points of distribution and the transfer of food between transporting vehicles and processing points and distribution points. Frequently, such foods are transferred from the processing point to refrigerated trucks or the like for transportation to the point of distribution. This of course requires special transport vehicles having special refrigeration equipment. Furthermore, in transferring the food between the processing point and transporting vehicles and between the transporting vehicles and distribution points, the food is subjected to bacteria contamination and temperatures above the levels desired to suppress bacteria growth.

In addition, many distribution points are not provided with the refrigeration equipment necessary to maintain the food at the desired temperatures. This may be due to the cost and complexity of such refrigeration systems and the lack of suitable refrigerants. For example, some have proposed the use of liquid nitrogen refrigerating systems. Liquid nitrogen is not readily available in many of the under-developed countries. Thus, such a system would not be suitable for use in many countries of the world.

SUMMARY OF THE PRESENT INVENTION

The present invention provides a system and method of processing, transporting and storing foods which is superior to the systems and methods of the prior art. With the present invention many of the problems of the prior art are eliminated, particularly the problems of processing, transporting and storing the food in continuous bacteria free environments.

The system disclosed, primarily for transporting and storing the food, may comprise one or more insulated portable food lockers, having a heat exchanger therein, for transporting the food to a point of distribution. A refrigerant system, including a refrigerant compressor, capable of maintaining the food at low temperatures is provided at the point of distribution. Means for connecting and disconnecting the refrigerant system to and from the food lockers is provided so as to permit the food lockers to be transported independently of the refrigerant system to and from other locations.

The food locker is designed so that the food can be placed therein and brought down to a suitable temperature at the processing point; then sealed therein for transportation. The locker can then be placed on a suitable transport vehicle for transfer to the point of distribution. At the point of distribution one or more of the food lockers can then be connected to the distribution refrigerant system allowing the food to be stored and maintained at suitable temperatures. Thus the food is maintained in a controlled bacteria free environment and at desired temperatures until the distributor, generally a retailer, places the meat on the shelf for purchase by his customers.

Utilizing such a system, a method of processing, transporting and storing meat may comprise the steps of: cutting and packaging meat; placing the packaged meat in the portable locker units; reducing the temperature of the packaged meat within the locker unit to between 30°F and 40°F; transporting the packaged meat and locker units to a point of distribution; connecting the locker unit heat exchangers to the refrigerant system located at the point of distribution; and maintaining the packaged meat in the interior of the locker units at temperatures between 30°F and 40°F.

By processing the food in controlled environments and maintaining it at temperatures between 30°F and 40°F, it is possible to extend the shelf life or display time of the food at least 3 to 5 days and possibly as much as seven to ten days, primarily due to reduction of bacteria exposure as well as retardation in bacterial generation time. The resulting food is much more appealing to the customer and better in quality. Substantial cost savings are attained through minimization of rework labor, trim loss and outright waste. Other reductions are attained in the simplified and less expensive refrigeration systems required. Many other objects and advantages of the invention will be apparent to those skilled in the art from a reading of the description which follows in conjunction with the accompanying drawings.

DESCRIPTION OF PREFERRED EMBODIMENTS

Figure 1:
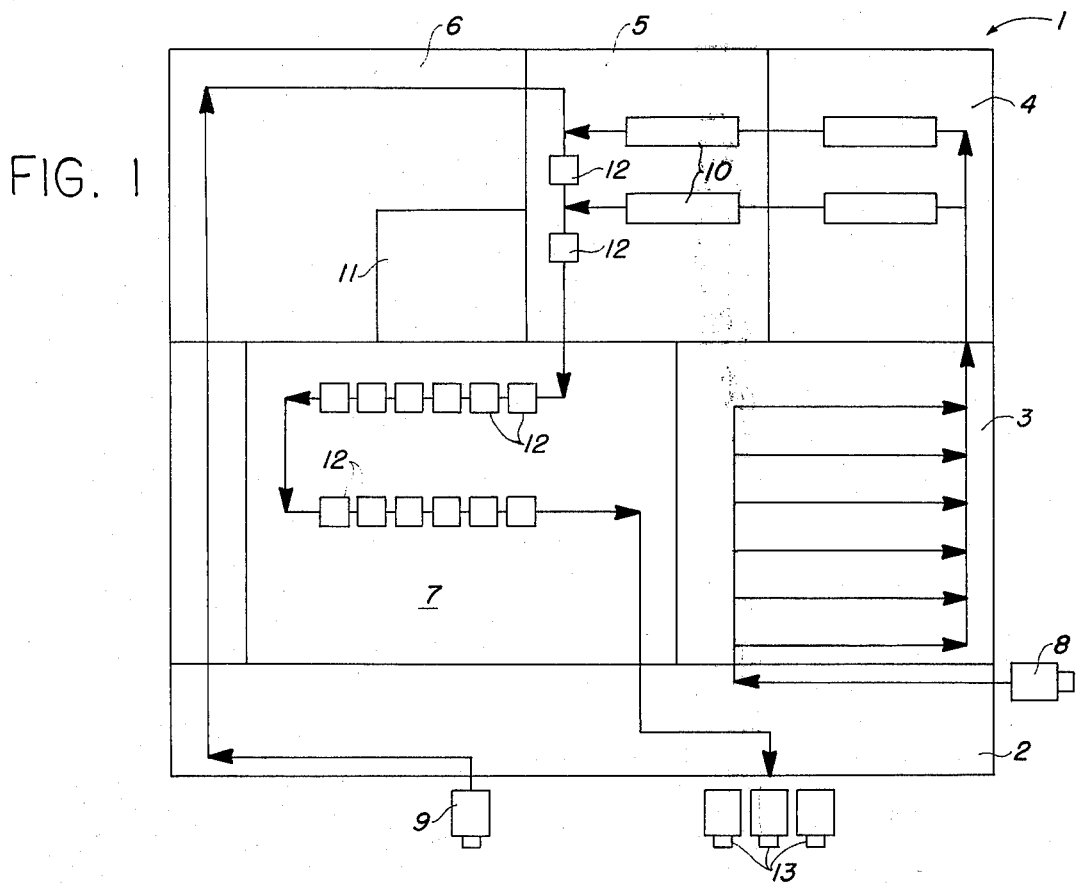
FIG. 1 is a schematic representation of a food processing point for utilization of the method and system of the present invention.

Referring first to FIG. 1, processing of food, in particular meat, according to preferred embodiments of the invention, at a processing point will be described. The processing point generally referred to at 1 may comprise a loading dock 2, a receiving cooler room 3, a primal cutting room 4, a cutting, packaging and locker loading room 5, a locker cleaning room 6 and a locker cooling room 7.

In processing, slaughtered animals may be brought in by vehicles 8 and placed in the receiving cooler room 3. The cooler room is maintained at temperatures between 30°F and 40°F, preferably 31°–33°F. The cooler room 3 may be provided with air treatment facilities, e.g., HEPA filters, so as to be maintained at Class 100,000 standards reducing air particulate contamination and air born bacterial to insignificant levels. Note: Class 100,000 is in compliance with Clean Room Federal Standard 209B and refers to no more than 100,000 particulates, 0.5 microns or smaller, per cubic foot of room space.

From the receiving cooler room 3, the meat is moved to a primal cutting room 4 where primal and subprimal cutting is performed. The primal cutting room is maintained at Class 100,000 standards with localized Class 100 standards at the actual meat cutting stations. Class 100 refers to no more than 100 particulates, 0.5 microns or smaller, per cubic foot of room space.

From the primal cutting room 4 the meat is moved to the cutting, packaging and locker loading room 5 where the meat is cut to customer size and packaged. This room is also maintained at Class 100,000 standards with Class 100 standards at the meat cutting and/or wrapping stations 10.

Meantime, empty portable food lockers may be delivered by vehicles 9 to the loading dock 2. The empty food lockers are then transferred, as indicated by the flow line, to the locker cleaning room 6 where they are thoroughly cleaned and placed in sterile condition. An area 11 may be provided for repairing any food lockers which are not in suitable mechanical condition.

When the food lockers are cleaned and sterilized they are transferred to the cutting, packaging and locker loading room 5 where they are loaded with the packaged customer cuts. Then the loaded food lockers 12 are transferred to the cooler room 7 where the meat and inside temperatures of the lockers are reduced to between 30°F and 40°F, preferably 31°–33°F. Although, as may be seen hereafter, the locker's temperatures may be reduced by individual refrigerant systems, it is preferable that they be left open for cooling by the separate refrigeration system of the cooler room 7. When the temperature is reduced as required, the locker units 12 are sealingly closed and moved to the loading dock 2 where they may be loaded on transport vehicles 13 for transportation to points of distribution.

Figure 2:
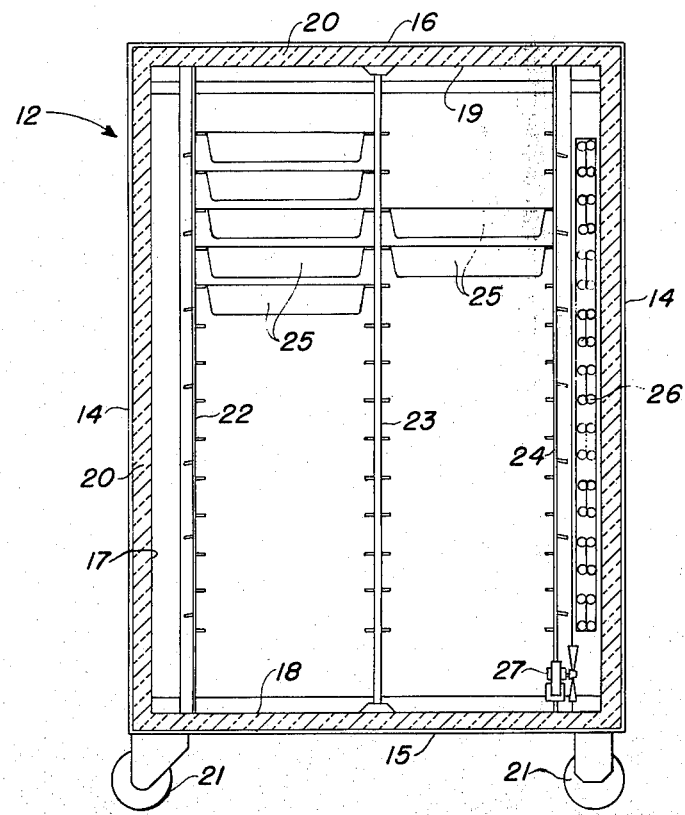
FIG. 2 is an elevation view, in cross-section, of a food locker unit according to a preferred embodiment of the invention.

Referring now to FIG. 2, a typical food locker or container 12, according to a preferred embodiment of the invention, will be described. The locker comprises external side walls, a bottom 15 and top 16 which may be of any suitable durable material. Because of its lightness, aluminum is particularly desirable. Spaced from the exterior walls are inside side walls 17, bottom wall 18 and top wall 19. These walls are preferably made of non-corroding and easily cleanable materials such as stainless steel. Insulation 20 is placed between the exterior and internal walls. Of course a door (not shown), having a suitable sealing assembly, is provided for access to the interior of the locker. No further description of such a door will be given since such doors are well within the state of the art.

The corners of the locker unit may be provided with wheels or casters 21 for ease of movement from one location to another. The locker unit, even one which is fully loaded, can be easily rolled from one location to another. Although any size unit could be built, it is contemplated that economic units of 1,000 to 2,000 pound capacity will be desirable.

The interior of the locker unit may be provided with rack assemblies 22, 23 and 24 for receiving a plurality of trays 25. The rack assemblies are also preferably made of stainless steel. The trays 25 may be of any desirable construction. However, some type of perforated construction to allow circulation of refrigerated air is preferred. Stainless steel wire baskets would be highly desirable.

Provided along one side of the interior of the food locker 12 is a heat exchanger or refrigeration coil 26. Mounted near the base of the unit is a blower or fan 27. When in operation, the blower or fan 27 would draw air from the bottom of the unit, blow the air upwardly across the refrigeration coils for recirculation from the top of the unit back to its floor. The air would pass over and around the packaged meat downwardly through the locker unit for recycling by the blower 27.

Figure 3:
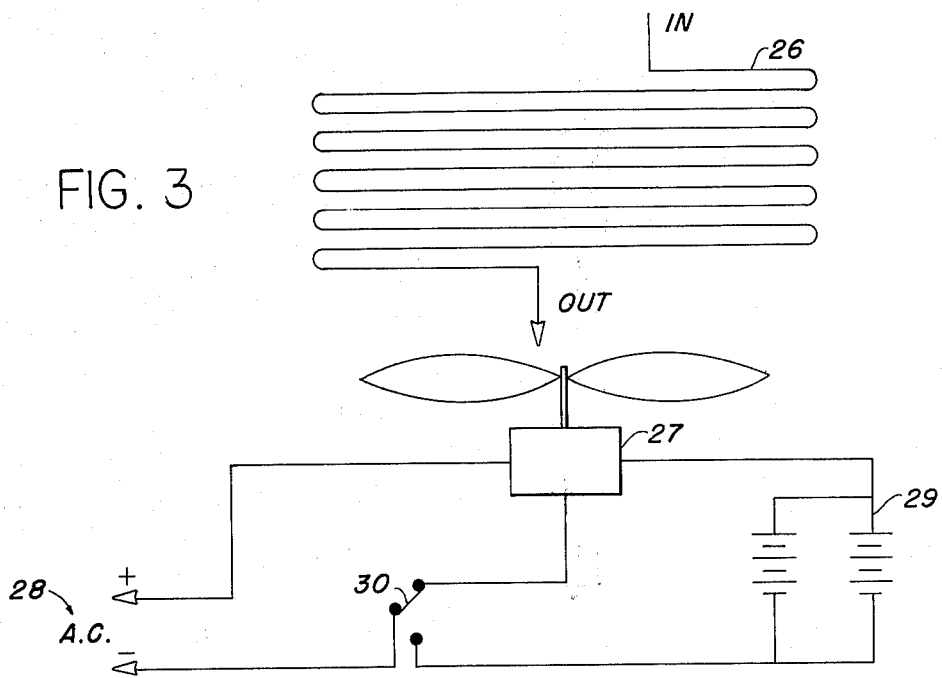
FIG. 3 is a schematic representation of a heat exchanger and blower, according to a preferred embodiment of the invention, which may be utilized with the food locker of FIG. 2.

Referring also to FIG. 3, where the heat exchanger and blower are schematically represented, it will be seen that the blower may be provided for connection to an A.C. power source 28. It may also be connected to an alternate D.C. power supply 29 for emergency operation. A switch 30 may be provided to connect the blower with the D.C. power source 29 in the case of failure or disconnection of the A.C. power source. This is to prevent stratification of air in case of such failure or disconnection.

It will be noted that only the heat exchanger 26 and blower 27, which make up part of a refrigeration system, are mounted on and carried by the locker unit 12. Other systems have been proposed in which the locker unit carries a complete self-contained refrigeration system. However, such locker units are more expensive to construct, operate and maintain. As will be seen hereafter, it is not necessary with the present invention to have such a self-contained refrigeration system.

Once the lockers 12 have been filled with meat, processed as described with reference to FIG. 1, they are loaded onto transport vehicles. With their insulated construction, it is usually not necessary to provide any intransport refrigeration if the time of transport is not too lengthy. However, if additional refrigeration is required during transport, the heat exchanger and blowers of each of the locker units may be connected to a central refrigeration system carried by the transport vehicle. Such a refrigeration system might be similar to the one to be described hereafter. Or, the blower might be connected only to a power source for air circulation (without refrigeration) during transit.

Figure 4:
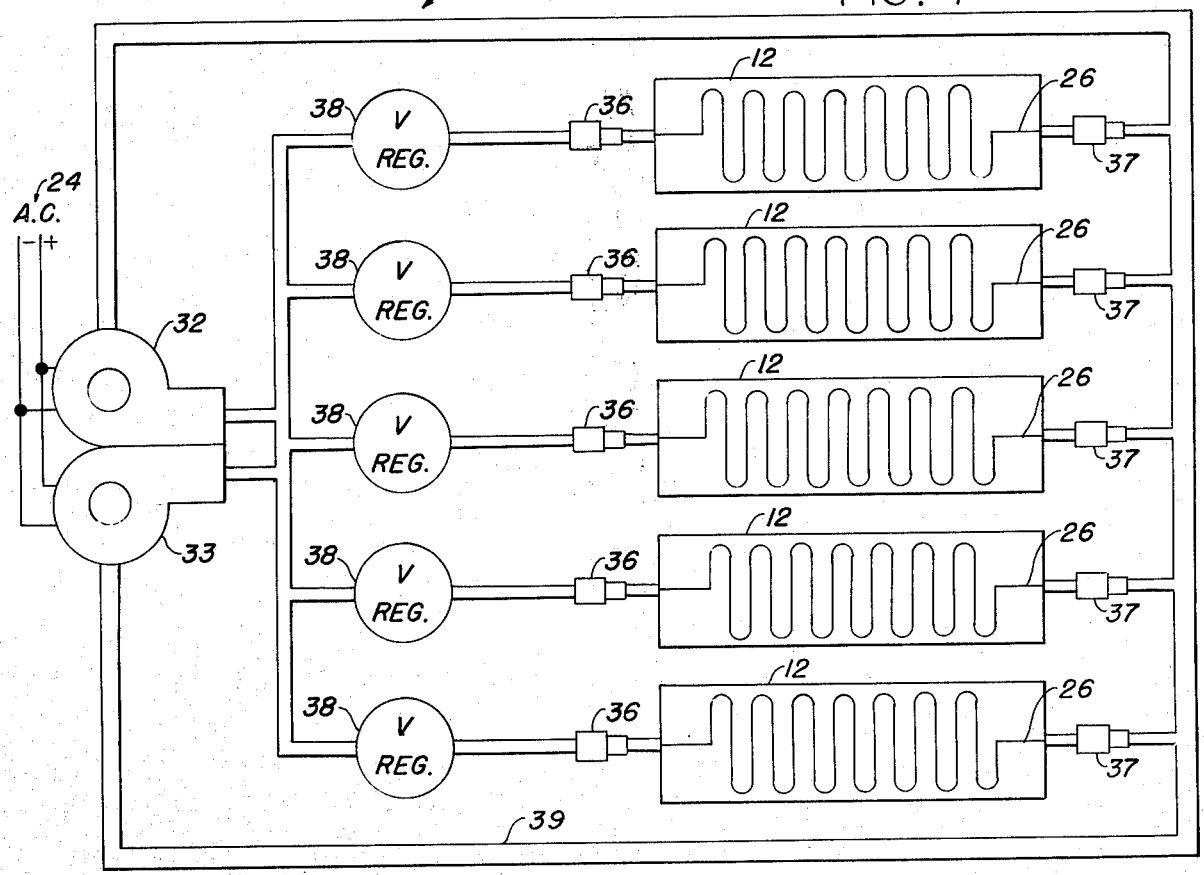
FIG. 4 is a schematic representation of a distribution refrigerant system, located at a point of distribution, shown connected to a plurality of food lockers, such as the one illustrated in FIG. 2.

Referring now to FIG. 4, a distribution point at which locker units 12 are to be transported will be described. As illustrated, several lockers 12 have been transported to the distribution point generally designated at 31. As already discussed, each of the locker units 12 is provided with a heat exchanger 26 and blower. A refrigeration system is provided at the distribution point including at least one refrigeration compressor 32. Another compressor 33 may be provided for back-up purposes although it is not necessary. The compressors 32 and 33 may be connected to an A.C. power source 34. For emergency purposes, an alternate D.C. power source (not shown) may be provided. The blowers of the various locker units 12 may also be connected to these same power sources.

The compressors 32 and 33 may be connected to the locker heat exchangers by inlet and outlet quick couple/quick disconnect couplings 36 and 37 respectively. Such couplings permit the locker units to be connected and disconnected from the distribution refrigeration system without substantial loss of refrigerant from either the heat exchanger or the distribution refrigerant system. If desired, flow regulators 38 may be provided between the discharge of the compressors 32 and 33 and the heat exchangers 26 to regulate refrigerant flow to each of the locker units 12.

In operation, the refrigerant is compressed at the compressors 32, 33, flows through the regulators 38 and heat exchanger 26 and returns by return loop 39 to the compressors. In this manner, the interior of the food lockers 12 may be maintained at a temperature of between 30°F and 40°F. As can be easily understood, it is therefore not necessary to remove the contents of lockers 12 until it is desired to place them on the shelf for customer selection.

The type of refrigerant contemplated for use in the present system is one of the fluorocarbon type, many times referred to by the tradename "Freon". Such refrigerant is relatively inexpensive and is readily accessible to any location to which food lockers might be transported.

Once a food locker has been emptied of its contents, at the point of distribution it would be returned to the processing point for cleaning and recycling.

From the foregoing description, it can be seen that the system and method of the invention for processing, transporting and storing food is a definite improvement over the prior art. The reduction in the amount of bacteria exposure and retardation in bacterial generation time is substantial. Substantial cost savings are effected through minimization of rework labor, trim loss and outright waste. An extended shelf life is attained with a much higher quality fresh food product. Such results are obtained with economically manufactured, operated and maintained equipment.

Although only one method and system of the present invention, and a few variations have been described herein, many other variations could be developed without departing from the spirit of the invention. It is, therefore, intended that the scope of the invention be limited only by the claims which follow.

We claim:

1. A method of processing, transporting and storing meat comprising the steps of:
   a. cutting and packaging meat;
   b. placing packaged meat in portable sealingly encloseable locker units having heat exchangers therein;
   c. reducing the temperature of said packaged meat within said locker units to temperatures between 30°F and 40°F;
   d. transporting said packaged meat and locker units to a point of distribution;
   e. connecting said locker unit heat exchangers to a refrigerant system, including a refrigerant compressor, located at said point of distribution; and
   f. maintaining said packaged meat and the interior of said locker units at temperatures between 30°F and 40°F;
   g. said cutting, packaging and transporting of said meat being completely conducted in a substantially bacteria free environment of no more than 100,000 particulates, 0.5 microns or smaller, per cubic foot.

2. A method of processing, transporting and storing meat as set forth in claim 1 in which areas of said environment in which actual cutting and packaging of said meat is performed is maintained at no more than 100 particulates, 0.5 microns or smaller, per cubic foot.

3. A method of processing, transporting, and storing meat as set forth in claim 1 in which the refrigerant utilized in said distribution refrigerant system is one of the fluorocarbon type.

4. A method of processing, transporting and storing meat as set forth in claim 1 in which said packaged meat and the interior of said locker units is maintained, during said transporting, at temperatures between 30°F and 40°F, said locker units being provided with blower means for preventing air stratification during said transporting.

5. A method of processing, transporting and storing meat as set forth in claim 4 in which said temperatures between 30°F and 40°F during said transporting is maintained by connecting said locker unit heat exchangers to a refrigerant system, including a refrigerant compressor, carried independently of said locker units on the transporting vehicle.

6. A method of processing, transporting, and storing meat as set forth in claim 5 in which the refrigerant utilized in said transporting refrigerant system is one of the fluorocarbon type.

\* \* \* \* \*